United States Patent
Kienzle et al.

(10) Patent No.: US 7,191,885 B2
(45) Date of Patent: Mar. 20, 2007

(54) CLUTCH LININGS COMPRISING FIBER-REINFORCED CERAMIC MATERIALS

(75) Inventors: Andreas Kienzle, Möttingen Ot Balgheim (DE); Mario Krupka, Adelsried (DE); Gustavo Cabello, Augsburg (DE); Peter Winkelmann, Thierhaupten (DE); Joachim Müller, Donauwörth (DE)

(73) Assignee: SGL Carbon AG (DE)

( * ) Notice: Subject to any disclaimer, the term of this patent is extended or adjusted under 35 U.S.C. 154(b) by 169 days.

(21) Appl. No.: 10/919,828

(22) Filed: Aug. 17, 2004

(65) Prior Publication Data
US 2005/0040004 A1    Feb. 24, 2005

(30) Foreign Application Priority Data
Aug. 20, 2003    (DE) .............................. 103 38 201

(51) Int. Cl.
*F16D 69/02*    (2006.01)

(52) U.S. Cl. .............................. 192/107 M; 192/70.14

(58) Field of Classification Search ..................... None
See application file for complete search history.

(56) References Cited

U.S. PATENT DOCUMENTS

| 5,875,877 A | * | 3/1999 | Atmur et al. | .......... 192/107 M |
| 6,723,193 B2 | | 4/2004 | Martin | |
| 7,011,200 B2 | * | 3/2006 | Herberg | ................. 192/107 M |
| 2003/0068164 A1 | | 4/2003 | Nanjyo | |

FOREIGN PATENT DOCUMENTS

| DE | 199 40 673 | 3/2001 |
| DE | 100 66 044 | 6/2002 |

* cited by examiner

*Primary Examiner*—Saul Rodriguez
(74) *Attorney, Agent, or Firm*—Connolly Bove Lodge & Hutz LLP

(57) ABSTRACT

In a friction pairing for clutch systems of two materials and processes for producing the pairing, one of the materials is a fiber-reinforced ceramic or metallic material A reinforced by carbon or ceramic fibers or whiskers. Material B acting against the material A in the friction pairing is selected from the group consisting of ceramic materials B11 and metallic materials B12, sintered metals B2, sintered oxidic ceramics B3, sintered nitridic ceramics B4, sintered carbidic ceramics B5 and organic sintered materials B6.

5 Claims, No Drawings

CLUTCH LININGS COMPRISING FIBER-REINFORCED CERAMIC MATERIALS

FIELD OF THE INVENTION

The invention relates to a friction pairing for clutch systems.

BACKGROUND OF THE INVENTION

Clutch systems are used in motor vehicles for separating the engine and gearbox. In modern vehicles, virtually exclusive use is made of friction clutches or hydrodynamic transmissions. In the customary friction clutch, the force-transmitting connection between the shaft from the engine and the shaft entering the gearbox is established by means of one or more disks pressed against one another, with at least one clutch disk connected to the shaft entering the gearbox, which has linings on both sides, being located between the flywheel of the engine and a clutch pressure plate. When the clutch pedal is depressed, the pressure plate is pushed away from the clutch disk against the spring force of the disk spring, as a result of which the clutch disk is released. The connection between the engine and the gearbox is thereby interrupted.

The magnitude of the torque which can be transmitted at a given static friction depends on the area and the diameter of the clutch disk and on the spring force of the disk spring. For large torques, clutch systems having a relatively large friction area or multidisk clutches are therefore used. The clutch disk is, especially on starting, subject to wear by rubbing and is heated by the friction. This heating can reduce the static friction and thus the torque which can be transmitted. Local heating also leads to nonuniform contact of the surfaces and thus to grabbing.

In view of this prior art, it is an object of the invention to provide clutch systems which display very little dependence of the static friction on the operating temperature and whose force locking via static friction is also independent of the twisting angle.

Friction pairings with ceramic materials, in particular fiber-reinforced ceramic materials, are known. When used as brake disks and brake linings, high thermal stability, high energy consumption and a coefficient of friction for sliding friction which has a low dependence on the load are required. In the case of clutch systems, high static friction and high torsional stiffness and also force locking due to static friction which is independent of the twisting angle are wanted.

During slipping of the clutch, force transmission occurs by sliding friction between the surfaces of the friction pairings. On changing from sliding friction to static friction, a transition which is not very abrupt which both contributes to the comfort of the clutch and avoids sudden torsional stress on the gearbox shaft is desirable. In the case of the materials used hitherto, long-term operation in a slipping state of the clutch slipping was not possible since, firstly, the strong heating in the case of conventional materials led to a change in the coefficient of friction of the friction pairing (these fluctuations in the coefficient of friction of the friction pairing lead to the well-known "grabbing") and, secondly, the demands made on the thermal stability of the surrounding equipment items were too severe.

SUMMARY OF THE INVENTION

It is therefore an object of the invention to provide a friction pairing for clutch systems which makes it possible for the clutch to be operated with continuous slipping and which make possible a very smooth, jerk-free transition from sliding friction to static friction.

This object is achieved by a friction pairing of two materials in which one of the materials is a fiber-reinforced ceramic or metallic material A which comprises reinforcing fibers comprising carbon or ceramic fibers or whiskers. The material B acting against the material A in the friction pairing is selected from the group consisting of ceramic materials B11 and metallic materials B12 whose matrix in the case of ceramic materials B11 preferably has a mass fraction of at least 40% of silicon carbide, whereas these materials B11 may be modified to form materials B11' by infiltration with metal melts, sintered metals B2, sintered oxidic ceramics B3, sintered nitridic ceramics B4, sintered carbidic ceramics B5 and organic sintered materials B6. According to the invention, it is also possible to use fiber-reinforced materials B or materials B reinforced with metal whiskers, with preference being given to choosing materials B reinforced with short carbon fibers, fibers comprising carbidic materials such as silicon carbide and boron carbide, fibers comprising oxidic or nitridic ceramic materials such as aluminum oxide and silicon nitride, amorphous fibers such as silicon-boron carbide-nitride and whiskers of high-melting metals such as molybdenum, tungsten, tantalum, osmium or hafnium or ceramic materials.

The fibers comprising carbon can be long fibers (having a weight average fiber length of at least 50 mm) or short fibers having a weight average fiber length of from 0.1 mm to 30 mm, preferably from 0.1 mm to 15 mm and in particular from 0.2 to 5 mm. Their diameter is from 4 µm to 12 µm, preferably from 5 µm to 10 µm and in particular from 6 µm to 8 µm. The preferred dimensions of the fibers comprising ceramic materials correspond to those of the short carbon fibers mentioned. The dimensions of the whiskers used correspond to the usual dimensions.

DETAILED DESCRIPTION OF THE PREFERRED EMBODIMENTS

Preferred materials B11 are oxidic ceramics such as aluminum oxide, aluminum titanate, magnesium oxide, yttrium oxide, hafnium oxide and zirconium oxide and also mixtures thereof, nitridic ceramics such as boron nitride, aluminum nitride, silicon nitride, titanium nitride and zirconium nitride and mixtures thereof, carbidic ceramics such as silicon carbide and also the carbides of boron, titanium, zirconium, hafnium, tantalum and tungsten and mixtures thereof. Particular preference is given to a composition containing at least a mass fraction of 40% of silicon carbide and also elemental silicon.

Suitable materials B11' are the materials mentioned above which have been modified by treating a porous material corresponding to B11 by infiltration with the melt of a metal such as copper, iron or titanium or a semimetal such as silicon or a mixture of the substances mentioned, resulting in the melt penetrating into the pores of the material and filling them.

Preferred materials B12 are metals which have a melting point of at least 600° C., particularly preferably at least 800° C., e.g. magnesium, aluminum, copper, iron, titanium, chromium, molybdenum, zirconium and their alloys. Alloys of copper such as bronze and brass are particularly useful.

Suitable materials B2 are sintered metals composed of high-melting metals and mixtures thereof, in particular metals having a melting point of at least 1500° C. Such metals include iron and, for example, niobium, tantalum, hafnium, titanium, zirconium, molybdenum and tungsten.

Preferred materials B3 are the following oxide ceramics: aluminum oxide, magnesium oxide, zirconium oxide and mixed phases of these with one another and with titanium dioxide and silicon dioxide.

Preferred materials B4 are the following nitride ceramics: silicon nitride, aluminum nitride, titanium nitride, zirconium nitride and mixed phases thereof.

Preferred materials B5 are the following carbide ceramics: silicon carbide, titanium carbide, tantalum carbide, tungsten carbide, beryllium carbide, boron carbide, zirconium carbide and hafnium carbide, and mixed phases thereof.

Suitable precursors for producing the material B6 are organic polymers which cannot be melted without decomposition, e.g. poly-p-oxybenzoate (®Econol), poly-amide-imide (®Torlon), poly-p-phenylenepyrolmellithimide, poly-m-phenyleneisophthalamide (®Nomex), poly-p-benzamide and polybenzimidazole (PBI). The materials B6 can be produced by sintering the milled polymers under pressure and at a temperature which is at least 10 K below the decomposition temperature. Preference is given to adding organic fibers to the pulverulent polymers, in particular fibers composed of poly-p-phenyleneterephthalamide (®Kevlar) and poly-m-phenyleneisophthalamide (®Nomex).

The linings comprising fiber-reinforced ceramic materials are preferably affixed to a carrier made of metal or fiber-reinforced ceramic. Fastening can be effected by adhesive bonding, screwing, riveting or by means of other suitable joining techniques.

The matrix of the fiber-reinforced ceramic materials B11 particularly preferably comprises from 60% to 90% of silicon carbide, from 0% to 30% of elemental silicon and from 0% to 10% of elemental carbon. The mass fraction of short carbon fibers in the ceramic material is preferably from 20% to 60%, particularly preferably from 25% to 50% and in particular from 30% to 35%.

The weight average length of the short carbon fibers is preferably from 0.001 mm to 30 mm, particularly preferably from 0.1 mm to 15 mm and in particular from 0.2 mm to 5 mm. Their diameter is from 4 µm to 12 µm, preferably from 5 µm to 10 µm and in particular from 6 µm to 8 µm.

The linings comprising the fiber-reinforced ceramic material preferably have a thickness of from 2 mm to 6 mm and have the shape of rounded rectangles, rounded trapezoids or ring segments, with the dimension in the direction of the clutch disk radius preferably being from 10 mm to 30 mm and that in the circumferential direction preferably being from 10 mm to 90 mm. Preference is given to at least 2, more preferably at least 3 and particularly preferably at least 4, of these linings being arranged symmetrically around the circumference of the clutch disk.

The materials for the linings can be produced by a multistage process, which in the case of the ceramic materials B11 reinforced with short carbon fibers comprises the following steps:

in the first step, short carbon fibers are mixed with carbonizable materials which soften upon heating (hereinafter referred to as "binders"), these mixtures are in the second step, pressed with application of pressure and heat to form bodies whose dimensions correspond to the desired linings, the pressed bodies are, in the third step, converted into porous carbon bodies interspersed by short carbon fibers with retention of their shape by heating in the absence of oxidizing agents, and these carbon bodies are in the fourth step, brought into contact with a silicon-containing melt under reduced pressure, so that the melt penetrates into the porous body and fills its pores, with at least part of the carbon reacting with the silicon to form silicon carbide.

According to the invention, it is also possible to choose the amount of melt in the fourth step so that the pores are not completely filled with the silicon-containing melt. The remaining accessible pores can then be filled, in a preferred embodiment, with a further melt which has a melting point of at least 550° C., preferably at least 600° C. Apart from metals which meet this condition, e.g. aluminum, iron, chromium, nickel, copper, molybdenum, tungsten, vanadium, niobium, tantalum, titanium and zirconium, preference is also given here to, in particular, alloys such as brass and bronze. The mass fraction of these metals in the matrix is preferably from 2% to 20%.

In the other cases, the starting materials (reinforcing fibers, ceramic materials, binders) are mixed and shaped, after which the binder is removed and the shaped body acquires coherence due to sintering under the action of pressure and heat. Here, sintering aids can be used in a known manner. If fiber-reinforced metals (known as "MMCs" (metal matrix composites)) are produced, it is advantageous to mix the metals in powder form with the reinforcing fibers and to press the mixture in a mold, and to heat the shaped bodies only slightly above the melting point of the metals. Agglomeration of the reinforcing fibers can be prevented in this way.

If mounting holes are necessary for attaching the linings to the clutch disk, they can advantageously be introduced into the porous carbon bodies obtained in the third step.

A preferred production variant for the materials according to the invention utilizes a continuous process in which the mixture of the short fibers and the binder is produced in a mixer and is introduced into a continuous screw extruder and extruded through a die which corresponds to the shape of the desired linings. The extrudate is then cut up, and the blanks obtained are carbonized and treated with the silicon-containing melt as described above. As a result of this method of manufacture, the preferential orientation of the short carbon fibers is perpendicular to the friction surface of the linings, and this has been found to have a particularly favorable effect on the level of the static friction.

The invention likewise provides for the use of the friction pairings described in clutch systems, with the clutch disk being made of a material as described under A and the clutch linings being made of a material as described under B.

The invention claimed is:

1. A friction pairing for clutch systems of two materials in which one of the materials is selected from the group consisting of fiber-reinforced ceramic and fiber-reinforced metallic materials A which comprise reinforcing agents selected from the group consisting of carbon fibers, ceramic fibers, and whiskers, and the material B acting against the material A in the friction pairing is selected from the group consisting of ceramic materials B11 and metallic materials B12, sintered metals B2, sintered oxidic ceramics B3, sintered nitridic ceramics B4, sintered carbidic ceramics B5 and organic sintered materials B6 which are sintered polymers selected from the group consisting of poly-p-oxybenzoate, polyamide-imide, poly-p-phenylene pyromellithimide, poly-m-phenylene isophthalamide, poly-p-bezamide, and polybenzimidazole.

2. A friction pairing as claimed in claim 1, wherein the matrix of the ceramic materials B11 has a mass fraction of at least 40% of silicon carbide.

3. A friction pairing as claimed in claim 1, wherein the materials B11 have been modified by infiltration with metal melts.

4. A friction pairing as claimed in claim 1, wherein the materials B are reinforced materials wherein the reinforcing agent is selected from the group consisting of fibers and whiskers.

5. A friction pairing as claimed in claim 4, wherein the reinforcing agents in the materials B are selected from the group consisting of short carbon fibers, fibers comprising carbidic materials, fibers comprising oxidic ceramic materials, fibers comprising nitridic ceramic materials, amorphous fibers, whiskers of high-melting metals and whiskers of ceramic materials.

* * * * *